United States Patent [19]

Hallmark et al.

[11] Patent Number: 5,043,948
[45] Date of Patent: Aug. 27, 1991

[54] BOREHOLE TELEVIEWER SYSTEM

[75] Inventors: Bobby J. Hallmark, Fort Worth; Thomas E. Standley, Joshua; Robert Mayer, Jr., Dallas, all of Tex.

[73] Assignee: Halliburton Logging Services, Inc., Houston, Tex.

[21] Appl. No.: 520,930

[22] Filed: May 9, 1990

Related U.S. Application Data

[63] Continuation of Ser. No. 252,986, Oct. 4, 1988, abandoned.

[51] Int. Cl.$^5$ .............................................. G01V 1/40
[52] U.S. Cl. ......................................... 367/35; 367/25; 367/911; 181/105
[58] Field of Search ...................... 367/35, 69, 911, 25, 367/32; 181/105; 73/623, 633, 637, 638, 639

[56] References Cited

U.S. PATENT DOCUMENTS

| | | | |
|---|---|---|---|
| 4,030,064 | 6/1977 | Elliott | 367/69 |
| 4,524,433 | 6/1985 | Broding | 367/25 |
| 4,829,488 | 5/1989 | Siegfried, II | 367/69 |
| 4,837,753 | 6/1989 | Morris et al. | 367/69 |
| 4,876,672 | 10/1989 | Petermenin et al. | 367/35 |

OTHER PUBLICATIONS

"Development of a New Borehold Acoustic Televiewer for Geothermal Applications", Transactions, vol. 9, Part II, Aug. 1985, Moore et al.

"Detection of External Pipe Defects with a Modified Borehole Televiewer", Kotchure et al., SPWLA 29th Annual Logging Symposium, June 5-8, 1988.

Primary Examiner—Ian J. Lobo
Attorney, Agent, or Firm—William J. Beard

[57] ABSTRACT

A borehole televiewer system is disclosed which includes a sonde adapted to be suspended in a borehole containing borehole fluids. A variable speed brushless DC motor within the sonde is utilized to drive a rotatable mount at selected speeds in order to maintain a rotational speed in proportion to the linear speed of the sonde through the borehole. A "quick-disconnect" transducer head, including diametrically opposed acoustic transducers, is mounted to the rotatable mount in direct contact with the borehole fluids and is utilized to repetitively transmit energy pulses at the wall of the borehole throughout each rotation. Receiver circuitry is then utilized to determine the amplitude and transit time for each reflected pulse in order to determine parameters of interest for the borehole wall. In a preferred mode of the present invention, the reflected pulses are then utilized to generate a video representation of the borehole wall in addition to providing a graphic plot. A magnetic tape storage device may also be utilized to provide long-term storage of the resultant investigation.

17 Claims, 4 Drawing Sheets

BOREHOLE TELEVIEWER SYSTEM

This is a continuation of application Ser. No. 07/252,986 filed Oct. 4, 1988, now abandoned.

BACKGROUND OF THE INVENTION

1. Field of the Invention

This invention relates in general to well logging systems and in particular to borehole televiewer systems which permit the wall of a borehole to be scanned in a manner which may be utilized to produce a visual indication of the borehole wall.

2. Description of tho Prior Art

Borehole televiewer systems are well known in the prior art. One example of such a system is disclosed in U.S. Pat. No. 3,369,626, wherein the walls of a borehole are scanned periodically with acoustic energy for obtaining information of interest. In one embodiment, a single transducer which acts both as a transmitter and receiver, is rotated in the borehole and periodically actuated to produce acoustic pulses which are applied to the borehole wall. Reflected energy is then detected by the transducer between acoustic pulses and converted into reflection signals.

A beam sweep is produced once for each transducer rotation signal and applied to the horizontal deflection plates of an oscilloscope to sweep an electron beam along a path horizontally across the screen of the scope. The reflection signals are then employed to intensity modulate the electron beam of the oscilloscope as the beam is swept across the screen of the scope.

In one embodiment of the aforementioned United States patent, a sawtooth waveform is produced during each transducer operating period which encompasses the expected arrival of the reflection signal. Each of these sawtooth waveforms is applied to both deflection plates of the oscilloscope to deflect the beam vertically from its otherwise horizontal path. The reflected energy is detected at a time which is a function of the time or distance between the transducer and the wall of the borehole. Thus, the reflection signals will intensify the electron beam during different time periods of each sawtooth waveform and at different vertically displaced positions. Hence, a horizontal trace is produced across the screen which has vertical excursions or deviations which are a function of the time or distance between the transducer and the wall of the borehole.

U.S. Pat. No. 3,550,075, discloses a technique and system which converts the reflection signals to pulses having heights which are a function of the time or distance between the transducer and the borehole wall. These pulses are employed to intensify the electron beam as it is swept across the screen of an oscilloscope during each downhole cycle. A resulting trace pattern is formed which varies in intensity or tones as a function of the time or distance between the transducer and the borehole wall. The trace patterns obtained by this method may be recorded in a side-by-side relationship to form a display which gives information about the configuration of the borehole wall.

The above-referenced patents both disclose so-called borehole televiewer systems which are typical of the commercially available systems currently employed. Such systems suffer certain deficiencies which prevent accurate scanning of the borehole wall. For example, the rotating or scanning transducer in each of these systems is generally provided in a fixed sleeve or cavity within the tool, which is then filled with a special hydraulic fluid. This fluid is selected to minimize the interface between the inside of the sleeve and the borehole fluids; however, the interface present still results in extraneous signal reflections and resonances which may cause parasitic components in the received signal. These parasitic components, when superimposed on the measured signal, will adversely affect the processing of the received signal.

A second deficiency in known borehole televiewer systems is the utilization of a fixed speed rotating member to drive the scanning transducer. Generally, a rotating member or motor is selected which operates at a selected rotation speed which will provide the degree of accuracy desired when the tool is moved axially through the borehole at a preselected speed. However, it is not always possible to log a borehole at a particular speed and the accuracy of the resultant measurements will suffer as the logging speed deviates from the design speed for a particular tool.

A final design deficiency of known borehole televiewers systems is the inability of the field engineer to rapidly and efficiently repair or replace the measurement transducer in a particular tool. This is due to the aforementioned method of mounting the rotating transducer in a sealed cavity filled with hydraulic fluids. One advantage of a design which will permit the exchange of the transducer head is the ability of the engineer to utilize a transducer which is particularly adapted to operate in a borehole of known diameter.

It should therefore be apparent that a need exists for an improved borehole televiewer system which permits a highly accurate scan of a borehole wall to be accomplished.

SUMMARY OF THE INVENTION

It is therefore one object of the present invention to provide an improved borehole televiewer system.

It is another object of the present invention to provide an improved borehole televiewer system having a rotating transducer head assembly which is in direct contact with the borehole fluids.

It is yet another object of the present invention to provide an improved borehole televiewer system which permits the rotating transducer head assembly to be rotated at a selectable variable speed.

The foregoing objects are achieved as is now described. The borehole televiewer system of the present invention includes a sonde which is adapted to be suspended in a borehole containing borehole fluids. A variable speed brushless DC motor within the sonde is utilized to drive a rotatable mount at selected speeds in order to maintain a rotational speed in proportion to the linear speed of the sonde through the borehole. A "quick-disconnect" transducer head, including two diametrically opposed acoustic transducers, is mounted to the rotatable mount in direct contact with the borehole fluids and is utilized to repetitively transmit energy pulses at the wall of the borehole throughout each rotation. Receiver circuitry is then utilized to determine the amplitude and transit time for each reflected pulse from the borehole wall, in order to determine parameters of interest for the borehole wall. In a preferred mode of the present invention, the reflected pulses are then utilized to generate a video representation of the borehole wall in addition to providing a graphic plot. A magnetic tape storage device may also be utilized to provide long-term storage of the resultant investigation.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
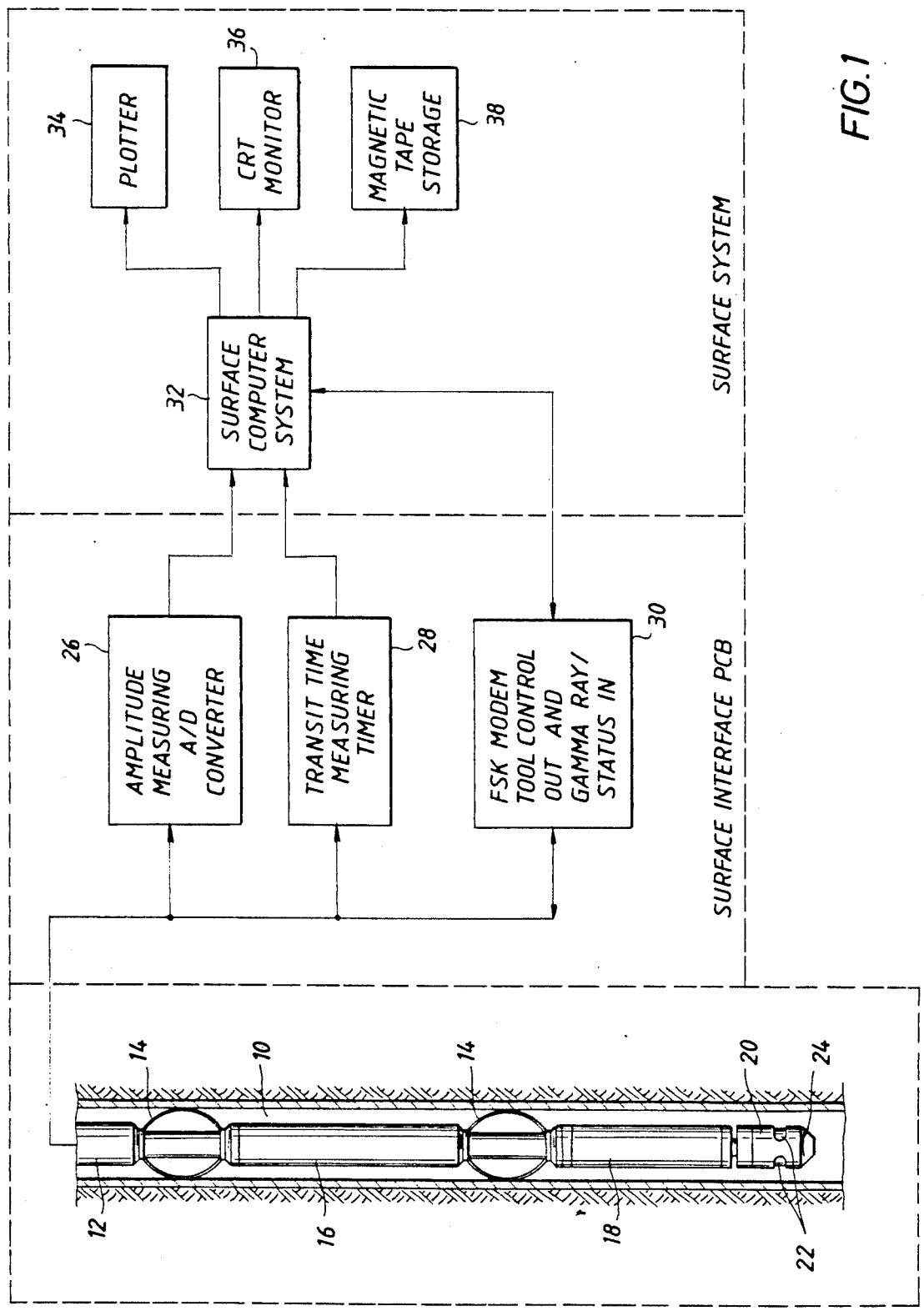
FIG. 1 is a partially schematic view of the borehole televiewer system of the present invention.

With reference now to the figures and in particular with reference to FIG. 1, there is depicted a partially schematic view of the borehole televiewer system of the present invention. As can be seen, the present invention includes a sonde 12 which is suspended in a borehole 10 and surrounded by borehole fluids. As those skilled in the art will appreciate, sonde 12 is generally suspended by a multi-conductor wireline cable (not shown) which is utilized to electronically couple sonde 12 to the surface electronics utilized. As can be seen, sonde 12 also includes a plurality of centralizers 14 which are utilized to maintain the position of sonde 12 in the center of borehole 10.

Sonde 12 preferably includes an electronics section 16 which encompasses the various downhole electronic circuits utilized in conjunction with the borehole televiewer system of the present invention. Mounted directly below electronics section 16 is scanner assembly 18, which will be depicted in greater detail herein. Finally, rotatably coupled to the bottom of scanner assembly 18 is transducer head 20. Transducer head 20 is rotatably mounted in order to rotate at a selected speed in direct contact with the borehole fluids. Transducer head 20 preferably includes at least two transducers 22 which are utilized in a manner depicted herein to regularly and periodically transmit electronic pulses radially outward to the wall of borehole 10 and receive the reflected signals generated thereby. Also mounted within transducer head 20 is magnetometer 24 which is utilized, in a manner well known in the art, to generate a signal indicative of the position of magnetic north so that rotation of transducer head 20 may be monitored by surface electronics.

Next, the various circuits present in the surface interface printed circuit board are depicted. Block 26 depicts the amplitude measuring analog-to-digital convertor which is utilized to provide a digital signal indicative of the amplitude of the measured reflected signal. Similarly, block 28 depicts the transit time measuring timer which is utilized to determine the transit time between the transmission of an energy pulse and the receipt of a reflected signal corresponding thereto. This, again, is converted to a digital signal for further processing. Finally, block 30 depicts the FSK modem which is utilized to pass control signals to and from sonde 12. Modem 30 is also utilized to transmit the output of a gamma ray tool which is generally run in conjunction with sonde 12 so that depth correlation may be accomplished with later logging efforts.

The outputs of amplitude measuring analog-to-digital convertor 26, transmit time measuring timer 28 and modem 30 are all coupled to a surface computer system 32, which is preferably a digital computer system especially designed to be utilized in conjunction with well logging systems. Various ancillary storage and display devices are coupled to surface computer system 32 including a plotter 34 which may be utilized to provide a hard copy of the resultant log. Plotter 34 may be implemented utilizing a laser plotter, a thermal plotter, or a CRT plotter as is well known in the prior art. Additionally, CRT monitor 36 may be utilized to provide an electronic visual indication of the results of the investigation of the borehole televiewer system of the present invention. Finally, magnetic tape storage device 38 is preferably utilized to provide long-term storage of the results of a survey conducted utilizing the borehole televiewer of the present invention.

Figure 2:
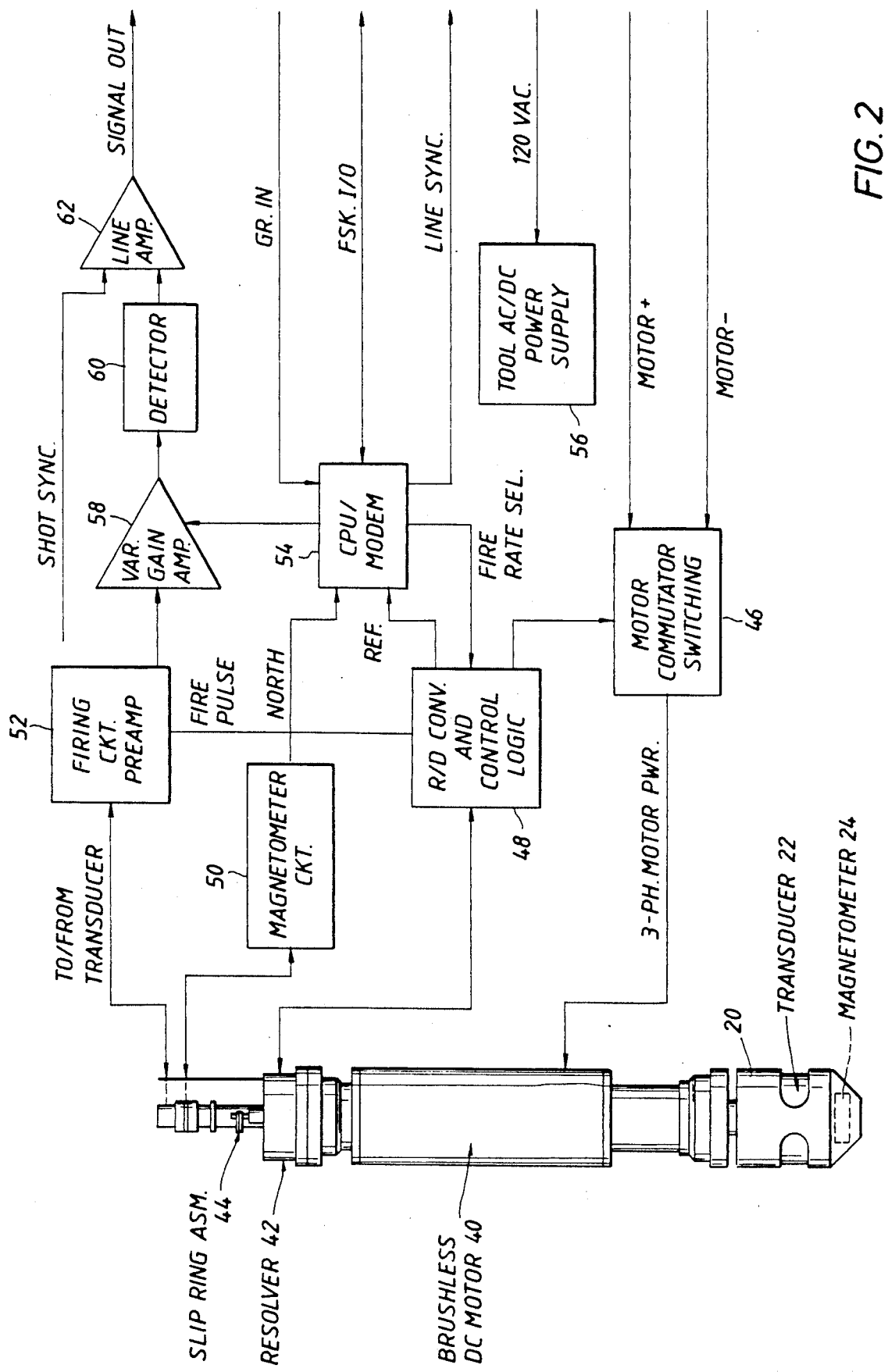
FIG. 2 is a partially schematic view of the downhole electronics of the borehole televiewer system of the present invention.

With reference now to FIG. 2, there is depicted a partially schematic view of the downhole electronics section 16 of the borehole televiewer system of the present invention. As can be seen, transducer head 20 is preferably rotatably mounted to scanner assembly 18 wherein a brushless DC motor 40 is mounted. Brushless DC motor 40 is preferably coupled to resolver 42 which is utilized to generate a digital signal indicative of the rotational position of transducer head 20 at any given moment during operation. The outputs of transducer 22 and magnetometer 24 are preferably coupled through a hollow shaft leading through brushless DC motor 40 and are electrically coupled from the rotating member by means of slip ring assembly 44.

The speed of brushless DC motor 40 is controlled by varying the voltage applied to motor commutator switching circuit 46. Motor commutator switching circuit 46 preferably provides a three-phase motor power signal which is coupled to brushless DC motor 40 and allows the surface operator to select a rotational speed for transducer head 20 which is sufficiently high so that the axial movement of sonde 12 through borehole 10 (see FIG. 1), will not adversely affect the accuracy of the logging being accomplished utilizing the borehole televiewer system of the present invention.

Control logic circuit 48 is utilized for several purposes. Control logic circuit 48 contains a rotation/digital convertor circuit which is coupled to resolver 42 and which generates a digital signal indicative of the rotation position of transducer head 20. Additionally, control logic circuit 48 include a reference signal generator which may be utilized to provide a reference signal with respect to rotation of transducer head 20 as measured against a reference position of sonde 12. Control logic circuit 48 also receives a firing rate selection signal from modem 54 which permits the surface operator to select a firing rate of between one hundred and five hundred pulses per revolution.

In the depicted embodiment of the present invention the surface operator may select a variable number of electronic pulses per revolution in multiples of one hundred shots per revolution. Similarly, the surface operator may also utilize control logic circuitry 48 to select the one of the two transducers 22 which is best suited to operation in the particular borehole. Those skilled in the art will appreciate that varying borehole diameters may be best measured by selecting a transducer 22 which is designed for utilization in a borehole of that diameter. By providing two transducers 22 within transducer head 20, the borehole televiewer system of the present invention permits the operator to select either one transducer or the other, thereby maximizing the efficiency of the measurement accomplished utilizing the borehole televiewer system of the present invention. In addition, the surface operator may elect to utilize either the reference signal generated by control logic circuitry 48 or, a magnetic north signal generated by magnetometer circuitry 50. Those skilled in the art will appreciate that it is not possible to detect magnetic north within a cased borehole and the utilization of a reference signal is indicated.

Firing circuit preamp 52 is utilized to couple a firing pulse to transducer 22 and to receive the reflected signal from the wall of borehole 10 in response to the transmission of such a firing pulse. The received signal output of firing circuit preamp 52 is coupled to variable gain amplifier 58 and then to detector 60. Detector 60 is utilized to rectify and filter the reflected signal so that it may be coupled via the multi-conductor cable (not shown) to the surface electronics.

The output of detector 60 is then coupled to line amplifier 62 which is utilized, in conjunction with a synchronizing signal from firing circuit preamp 52, to amplify the output of detector 60 and transmit that output to the surface electronics. Central processing unit/modem 54 is utilized to provide communications between the downhole electronics and the surface electronics in order to permit the surface operator to communicate with the downhole electronic circuitry.

As discussed above, the surface operator may select a variable firing rate or, may choose between a reference signal and a magnetic north signal from the downhole electronic circuits. Additionally, the surface operator may control the gain of variable gain amplifier 58. Modem 54 is also preferably utilized to couple the output of the aforementioned gamma ray tool to the surface operator. Finally, tool power supply 56 is coupled to a 120 volt DC signal which is coupled from the surface and is utilized to provide the various voltage levels required for operation of the downhole tool and its associated electronic circuitry.

Figure 3A:
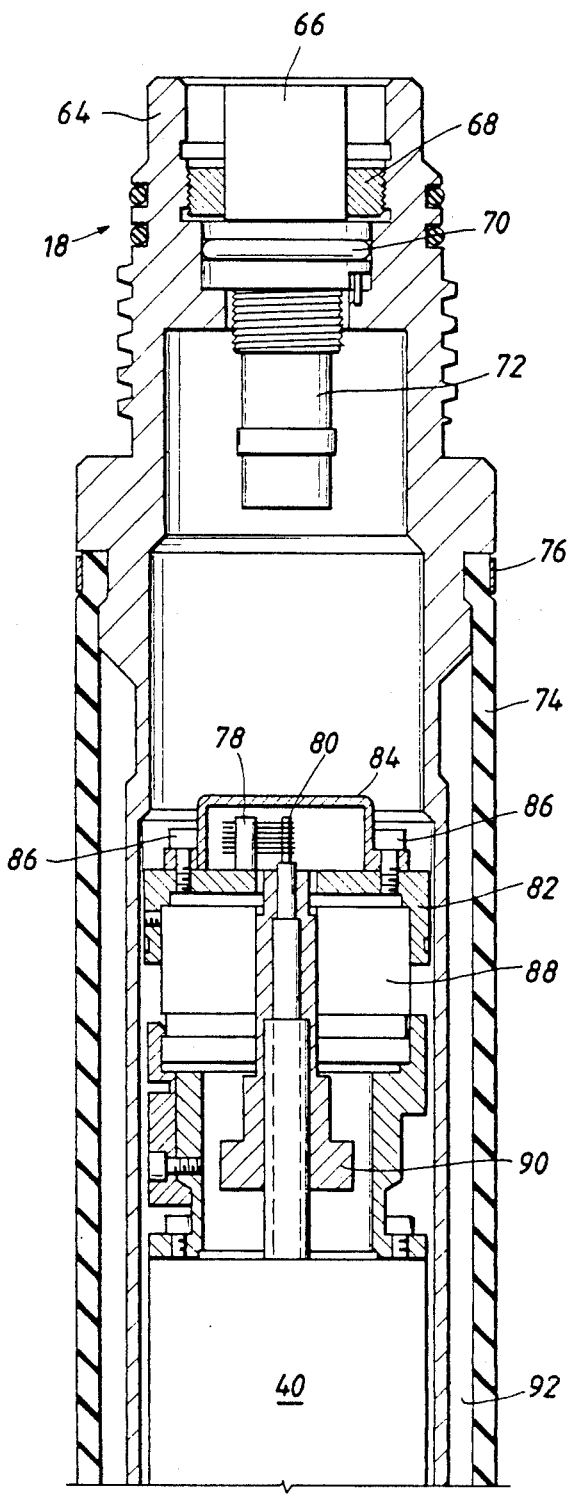
FIG. 3A-3C when placed end-to-end, form a sectional view of the rotating transducer assembly of the borehole televiewer system of the present invention.
Figure 3B:
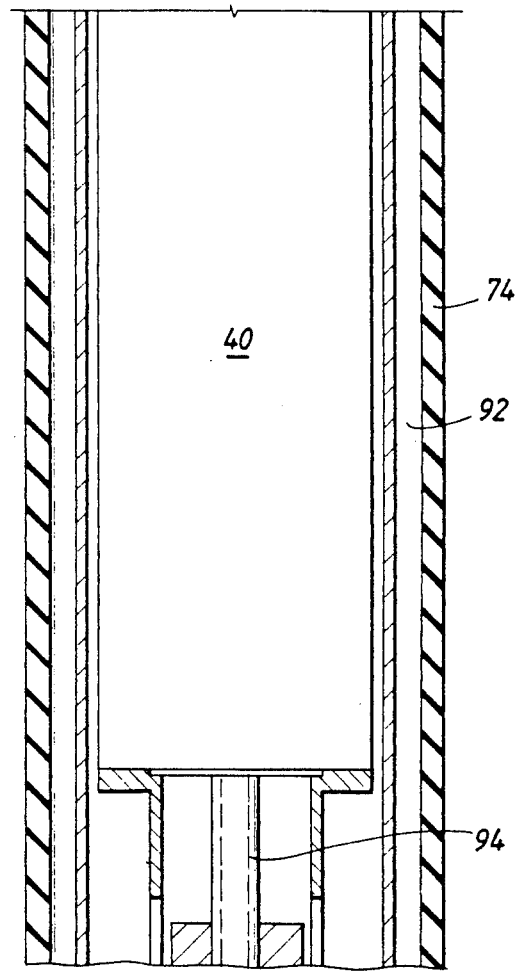
Figure 3C:
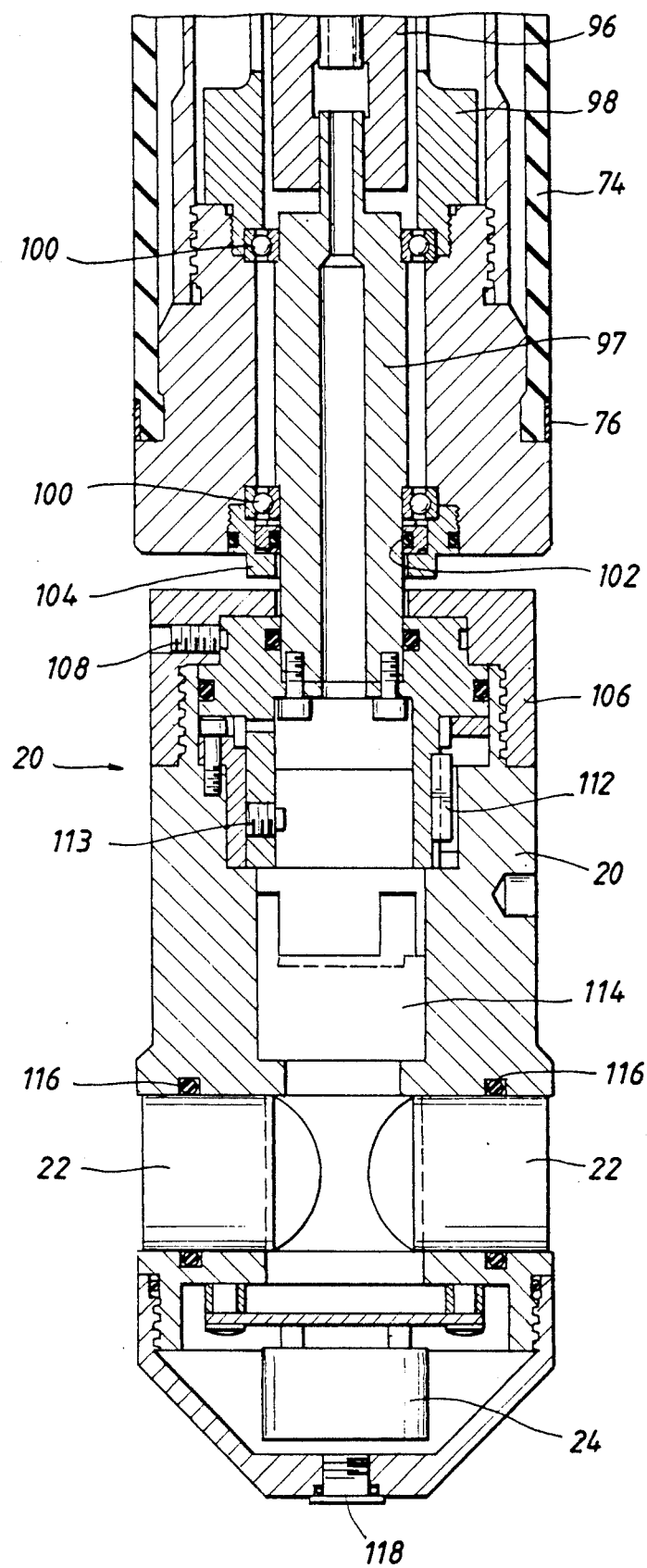

Referring now to FIGS. 3A-3C, there is depicted a sectional view of scanner assembly 18 and transducer head 20 of the borehole televiewer system of the present invention. As can be seen, a connector subassembly 64 is provided which may be threadably coupled to additional sections of sonde 12. Electronics connector 66 is preferably fitted into the upper-half of subassembly 64 and is utilized, as those skilled in the art will appreciate, to provide a means for electronically coupling the components of scanner assembly 18 to electronic section 16 of sonde 12. Retaining nut 68 is preferably utilized to maintain the position of electronics connector 66 within connector subassembly 64.

Seal 70 is preferably utilized with a backing plate (not shown) to provide a barrier wherein hydraulic fluid or other liquid within scanner assembly 18 may be sealed within the scanner assembly. A second electronics connector 72 is utilized within connector subassembly 64 to facilitate the coupling of electronic signals into and out of the connector subassembly.

Pressure compensation within scanner assembly 18 is accomplished by the utilization of a rubber sleeve 74 which is preferably mounted to each end of the connector subassembly 64 by means of a stainless steel strap 76. As those skilled in this art will appreciate, the interior of rubber sleeve 74 is then filled with a hydraulic fluid 92. Rubber sleeve 74 may then be utilized to provide pressure compensation for the interior of scanner assembly 18 by reacting to the pressure of borehole fluids within borehole 10 to distend inwardly, increasing the pressure on hydraulic fluid 92 and equalizing the pressure within scanning assembly 18.

Mounted within the pressure compensated confines of rubber sleeve 74 is brushless DC motor 40. The uppermost shaft of brushless DC motor 40 is coupled, via shaft extender 90 into resolver 88. Resolver 88 is utilized, as those skilled in the art will appreciate, to provide a precise indication of the angular position of transducer head 20. Brush mount 82 is mounted to resolver 88 and serves as a mounting plate for brushes 78 which are utilized to provide electrical contact to slip rings 80. A brush cover 84 is then utilized to protect brushes 78 and slip rings 80. In this manner, the operation of brushes 78 and slip rings 80 may be utilized to couple electrical signals from a rotating shaft to a non-rotating electrical connection. Brush cover 84 is preferably retained in position by brush cover screws 86.

Lower shaft 94 of brushless DC motor 40 is preferably coupled, via flexible shaft coupling 96 to rotator shaft 97. Rotator shaft 97 is rotatably mounted within a plurality of ball bearings 100 and extends through the lower end of scanner assembly 18 to provide a mounting point for transducer head 20. O-ring seals 102 and metal seal 104 are utilized, in a manner well known in the art, to retain hydraulic fluid 92 within scanner assembly 18 during rotation of rotator shaft 97.

With particular reference now to FIG. 3C, a sectional view of transducer head 20 is depicted. As can be seen, a spinner nut 106 is provided and retained in place with regard to rotation of transducer head 20 by means of set screw 108. Further, rotation of transducer head 20 is prevented by means of key 112 and set screw 113.

Mounted within transducer head 20 are transducers 22. In the depicted embodiment of the present invention, transducers 22 are preferably mounted at diametrically opposed positions on either side of transducer head 20. Although only one transducer 22 is activated during operation of the borehole televiewer system of the present invention, the operator may select either transducer and thereby utilize a transducer which is most effectively designed for utilization in a particular borehole. As can be seen, each transducer 22 is preferably mounted within transducer head 20 in conjunction with O-ring seals 116. Additionally, magnetometer 24 is mounted within transducer head 20 and is utilized, as discussed above, to provide an indication of magnetic north during rotation of transducer head 20. Drain plug 118 may be utilized to permit transducer head 20 to be filled with hydraulic fluid or other fluid to ensure that the pressures encountered during operation in a borehole do not damage magnetometer 24.

In the manner depicted herein, transducer head 20 may be simply and easily removed from the rotating end or rotator shaft 97 by releasing set screw 108 and unthreading transducer head 20 from spinner nut 106. In this manner, the operator may rapidly and efficiently change the transducer head to utilize a head which has a different diameter to maintain a nominal distance between the rotating transducer and the surface of the borehole wall, or to utilize a different type of measurement device. Such a capability is not possible with known borehole televiewer systems which utilize a rotating transducer which is mounted within the head in a cavity filled with hydraulic fluid.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A borehole televiewer system for recording signals obtained from cyclic scanning operations carried out angularly around the wall of a borehole at each of a plurality of different depths, said system comprising:
   (a) an elongate sonde adapted to be suspended in a borehole containing borehole fluids;
   (b) a rotating head mounted at the lower end of said sonde and adapted to rotate about the longitudinal axis of said sonde and in direct contact with said borehole fluids;
   (c) at least one acoustic transducer supported by said rotating head in direct contact with said borehole fluids;
   (d) motor means enclosed within said sonde for rotating said rotating head around said axis on an elongate shaft extending downwardly from said motor means;
   (e) seal means cooperatively surrounding said shaft to provide pressure fluid isolation at said shaft to enable said shaft to extend externally of said sonde in the borehole at ambient pressure conditions; and
   (f) an elongate resilient sleeve surrounding said sonde to define a fluid isolation means for communicating borehole pressure while isolating said sonde from borehole fluid.

2. The system of claim 1 further including commutating means on said shaft at the upper end thereof to commutate signals from the conductors extending from said transducer along said shaft to a space within said sonde isolated from borehole fluids so that said transducer signals connect with circuit means within said sonde.

3. The system of claim 2 wherein said sonde encloses circuit means for determining transit time of signals transmitted from said transducer to the sidewall of the borehole and returning therefrom and also including means for measuring signal amplitude of the signals for which transmit time is measured.

4. The system of claim 3 including:
   (a) means closing the lower end of said shaft;
   (b) a closed housing around said sonde to form an enclosure for said motor means and said circuit means therein wherein said housing is within said sleeve; and
   (c) angular resolver means connected to said shaft to measure angular orientation of said shaft and said transducer connected thereto.

5. The system of claim 4 including an axial passage along said shaft wherein shaft extends fully through said motor means, and said motor means is located in said sonde below said circuit means and said commutating means.

6. The system of claim 5 wherein said transducer is supported on an exposed mount at the lower end of said shaft and said mount comprises the means closing the lower end of said shaft.

7. A borehole televiewer system for recording signals obtained from cyclic scanning operations carried out angularly around the wall of a borehole at each of a plurality of different depths, said system comprising:
   (a) an elongate sonde adapted to be suspended in a borehole containing borehole fluids;
   (b) a rotating head mounted at the lower end of said sonde and adapted to rotate about the longitudinal axis of said sonde and in direct contact with said borehole fluids;
   (c) at least one acoustic transducer supported by said rotating head in direct contact with said borehole fluids;
   (d) motor means enclosed within said sonde for rotating said head around said axis on an elongate shaft extending from said motor means;
   (e) wherein said shaft is hollow and sufficiently long that said shaft extends below said motor means and above said motor means;
   (f) means sealing said rotating head so that borehole fluid is prevented from entry in said hollow shaft; and
   (g) cable means extending from said head through said shaft into said sonde above said motor means.

8. The system of claim 7 wherein said sealing means comprises:
   (a) means which mounts said transducer on said rotary head, and which additionally seals the lower end of said hollow shaft;
   (b) commutator means at the upper end of said hollow shaft for connection with said cable means to obtain signals from said transducer wherein said commutator means provides signals outputs therefrom above said motor means within said sonde; and
   (c) circuit means connected to said commutator means within said sonde wherein said circuit means are supported above said motor means within said sonde.

9. The system of claim 8 wherein said circuit means includes means for measuring transit time of signals transmitted from said transducer and reflected by the sidewall of the borehole, and additionally includes means for measuring the amplitude thereof.

10. The system of claim 9 additionally including means forming a signal indicative of the azimuth of the direction of the transducer at the time of transmission of a signal transmitted therefrom.

11. The system of claim 10 wherein azimuth forming means measures the angular orientation of said shaft during rotation of said motor means.

12. The system of claim 11 wherein said motor means is an axially hollow elongate structure on said sonde and is sealed therein by a sleeve preventing entry of borehole fluid.

13. A borehole televiewer system for recording signals obtained from cyclic scanning operations carried out angularly around the wall of a borehole at each of a plurality of different depths, said system comprising:
   (a) an elongate sonde adapted to be suspended in a borehole containing borehole fluids;
   (b) a rotating head mounted at the lower end of said sonde and adapted to rotate about the longitudinal axis of said sonde and in direct contact with said borehole fluids;

(c) at least one acoustic transducer supported by said rotating head in direct contact with said borehole fluids;

(d) motor means supported by said sonde for rotating an elongate hollow, axially positioned shaft connected to said rotating head for rotation around said axis wherein said shaft extends from below said motor means to above said motor means;

(e) upper and lower end opening in said shaft;

(f) commutating means supported above said motor means to cooperate with said shaft for connecting from said transducer through said shaft and extending internally within said shaft to enable signal transmission during rotation by said transducer;

(g) transmitting and receiving means coupled to said transducer for periodically transmitting energy pulses at the wall of said borehole and for receiving energy signals reflected from said borehole wall;

(h) recording means coupled to said transmitting and receiving means for recording said received energy signals;

(i) amplitude measuring means connected to said receiving means to measure received energy signals for said recording means; and (j) transit time measurement means for measuring elapsed time following transmission of an energy pulse to the wall of the borehole and reflected energy signal return.

14. The system of claim 13 wherein said shaft extends fully through said motor means to position the open lower end therebelow connected with said rotating head, and the upper end thereof above said motor means for connection with said commutating means to provide output signals therefrom to said transit time measurement means and also to said amplitude measuring means.

15. The apparatus of claim 14 including an elongate sleeve surrounding said sonde to define fluid isolation means which prevents borehole fluid from entry into said sonde.

16. The system of claim 15 wherein said sleeve terminates on said sonde so that said rotating head, said transducer, and the lower end of said shaft extend therefrom to position said transducer below said sonde in contact with fluid in the borehole.

17. The apparatus of claim 16 including seal means cooperative between said sonde and said shaft above the lower end thereof the provide fluid isolation along the exterior of said shaft so that borehole fluids are prevented from entry in said sonde along said shaft.

* * * * *